United States Patent [19]

Frost

[11] Patent Number: 4,721,194

[45] Date of Patent: Jan. 26, 1988

[54] CLUTCH ROCKER MECHANISM FOR TRANSFER CASE

[75] Inventor: Barry L. Frost, DeWitt, N.Y.

[73] Assignee: Chrysler Motors Corporation, Highland Park, Mich.

[21] Appl. No.: 917,938

[22] Filed: Oct. 14, 1986

[51] Int. Cl.⁴ .................... F16D 11/12; F16D 21/02
[52] U.S. Cl. .................... 192/48.91; 192/71; 192/93 B; 192/108
[58] Field of Search ............ 192/48.91, 108, 93 B, 192/93 C, 65, 71; 74/107

[56] References Cited

U.S. PATENT DOCUMENTS

| | | | |
|---|---|---|---|
| 2,412,208 | 12/1946 | Dence | 192/53 F |
| 2,447,058 | 8/1948 | Dence | 192/48.91 |
| 3,333,661 | 8/1967 | Pawlina et al. | 192/93 B X |
| 3,502,184 | 3/1970 | Pawlina et al. | 192/93 B X |
| 3,938,634 | 2/1976 | Frost | 192/71 X |
| 4,033,437 | 7/1977 | Labat | 192/53 F |
| 4,373,604 | 2/1983 | Lunn et al. | 180/247 |
| 4,408,684 | 10/1983 | Gladich | 192/53 G |
| 4,677,873 | 7/1987 | Eastman et al. | 74/665 GE |

*Primary Examiner*—Rodney H. Bonck
*Attorney, Agent, or Firm*—Edward P. Barthel

[57] ABSTRACT

An improved clutch shift mechanism for use with a motor vehicle transfer case. A cylindrical drive shell is concentrically positioned around a shaft axis in spaced relation to a relatively rotatable coaxial coupling member formed with external spline teeth. A plurality of axially directed circumferentially spaced slots are provided in the drive shell with each slot receiving a rocker key having an internal spline tooth at each ends of its inner face. The interior of the drive shell has grooves sized to capture therein a center and side annular springs. Each rocker key inner surface has a center notch and side notches receiving their associated springs therein with the key in its neutral position. An axially slidable shift ring surrounds the shell and includes an annular cam surface engaging a central depression in each key. Upon the shift ring being moved axially, each key is pivoted about the central spring causing the side spring to be compressed until each rocker key tooth drivingly engages a coupling members external spines. The side spring is operative to resiliently bias each rocker key one end to its neutral position upon the shaft ring being returned to its centered neutral position.

4 Claims, 8 Drawing Figures

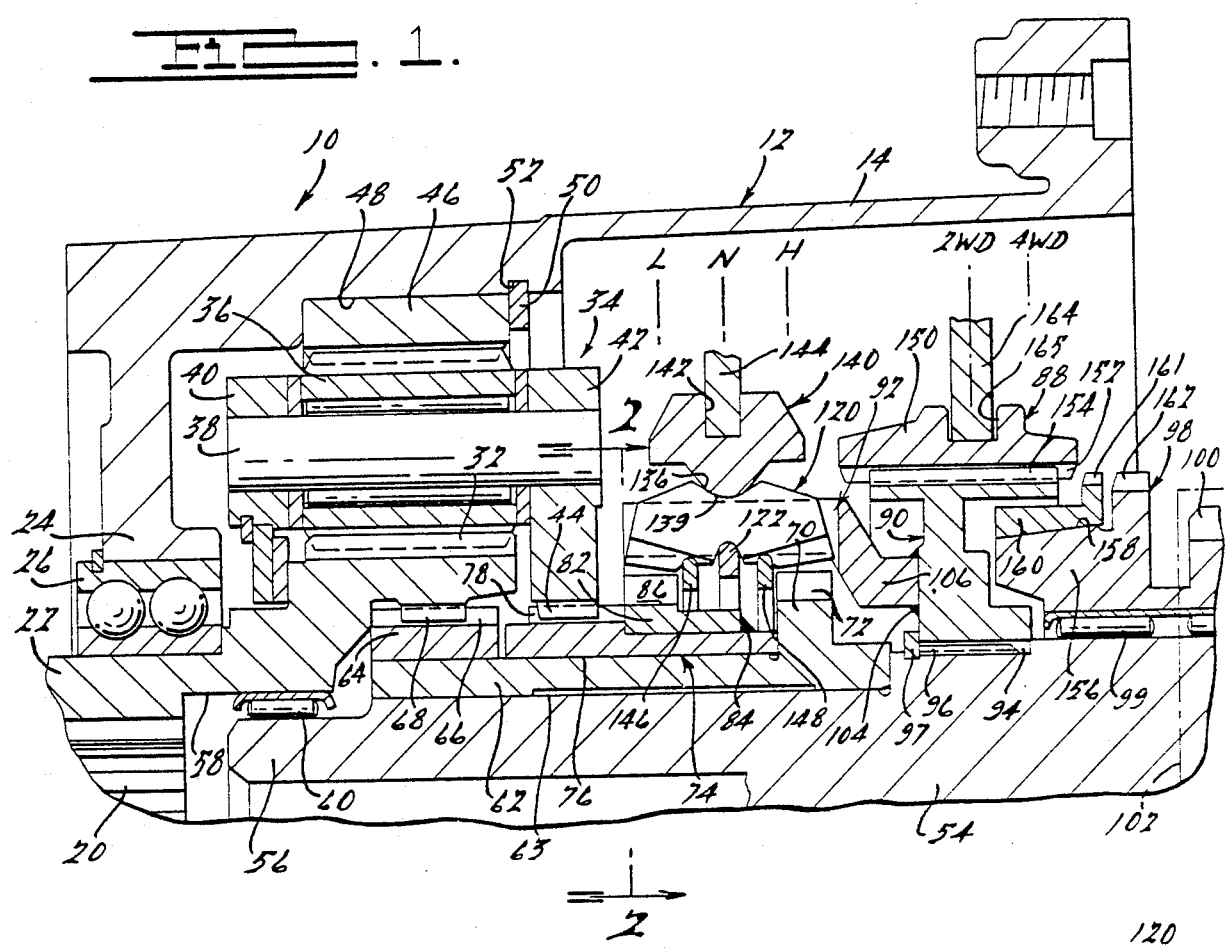

CLUTCH ROCKER MECHANISM FOR TRANSFER CASE

BACKGROUND OF THE INVENTION

This invention relates to a clutch rocker shift mechanism, and more particularly to such a mechanism for use with a vehicle transfer case allowing range shifting while the vehicle is in motion.

The prior art contains various clutch rocker mechanisms for selectively clutching either of two gear trains to the main shaft of a transmission. The U.S. Pat. No. 2,412,208 issued Dec. 10, 1946 to D. S. Dence discloses one such clutching mechanism wherein a single snap ring engages an exterior notch in the rocker members and locks them in place. Further, the positive clutching rocker members are used in combination with a synchronizing mechanism required to bring the gears up to synchronous speed prior to the rocker members achieving positive engagement clutching.

The U.S. Pat. No. 4,408,684 issued Oct. 11, 1983 to Gladich discloses a sequence shifting coupling. In the Gladich patent a gear clutch for selective locking engagement of a coupling element with a corresponding gear comprises a rocker reciprocably pivoting on a coupling element and movable therewith. The rocker alternately interlocks with related gears via shifting and spring means operatively interconnected therewith.

The U.S. Pat. No. 4,033,437 issued July 5, 1977 to Labat relates to a synchronizer with rocking key disengagement. Labat shows a synchronizer ring being braced by a set of rocking keys each of which is located in an axial groove in the drawing collar and is arranged to rock as a radially outward biased thruster.

BRIEF DESCRIPTION OF THE INVENTION

It is one object of the present invention to provide an improved clutch rocker key coupling device for a motor vehicle gearbox which is readily adaptable to a generally symmetrical gear transmission having respective sets of axially spaced external spline teeth of like pitch and diameter.

Another object of the present invention is to provide a clutch rocker mechanism for use with a four-wheel drive vehicle transfer case which allows for range shifting while the vehicle is in motion.

It is another object of the invention to provide an improved clutch rocker shift mechanism for use with a four-wheel drive vehicle transfer case which requires minimal effort to disengage radial rocking key members while under gear engaged load.

It is a further feature of the present invention to provide an improved clutch rocker mechanism wherein annular side springs achieve positive resiliently biased return of the radial rocking keys to their neutral position from their gear engaged synchronizing and selectively clutching mode.

One application of the present invention is in a transfer case apparatus adapted for a four-wheel drive motor vehicle. The transfer case has an input shaft adapted for connection to the vehicle engine. A first output shaft of the case is drivingly connected to the rear wheels and a second output shaft is drivingly connected to the front wheels. High and low planetary gear reduction means is positioned between the input shaft and the first output shaft. An intermediate sleeve concentrically surrounds the first output shaft for relative rotation therewith while a range clutch collar is journally supported on the sleeve. The improved clutch rocker coupling device of the present invention is adapted to selectively interconnect the input shaft and the first output shaft by means of an axially movable shift ring operated by a conventional shift fork.

A drive shell which surrounds the output shaft, has an inner cylindrical surface disposed in a concentric manner around the range clutch collar. The drive shell is formed with a plurality of axially directed equally spaced slots with a rocking key located in each of the shell slots. The drive shell inner surface is formed with a center annular groove and a pair of fore and aft or side annular grooves. Each of the side grooves is located in a transverse plane equidistant from the center groove defined by a transverse medial plane. A center expanding snap ring and a pair of expanding side snap rings are captured in the shell center groove and side grooves, respectively. Each rocker key outer surface is formed with a central depression engaged by an annular cam surface formed on the interior of the shift ring.

The rocking keys inner faces are provided with a center notch and a pair of side notches dimensioned to receive the center snap ring and the side snap rings, respectively. The shift ring is operative when moved axially a predetermined distance aft to pivot each rocker key aft end inwardly about the center snap ring from its neutral position. This causes the aft side snap ring to be compressed such that an associated spline tooth on the aft end of each rocker key drivingly engages external spline teeth formed on the sleeve. As a result the torque flow from the input shaft is applied directly from the sleeve to the clutch shell and thence by suitable means to the rear wheel output shaft.

Upon the shift ring being moved axially in the opposite or forward direction to its center position cam contact between the shifting ring cam and the rocker keys is released. This allows the compressed side snap ring to resiliently pivot the rocker keys radially outward until the side snap ring engages its associated shell internal side groove positively and quickly returning the keys to their neutral position. In a like manner movement of the shift ring forward pivots each rocker key forward inwardly compressing the forward side snap ring. This causes the spline tooth on the forward end of each rocker key to drivingly engage external spline teeth formed on the collar. As a consequence, the torque flow from the input shaft is directed through the planetary speed reduction gears to the planetary carrier which is splined to the collar. The collar, being engaged by the rocker keys, transmits the drive torque to the coupling shell and thence by suitable clutch means to a silent chain which drives the front wheel propeller output shaft. Stop means are provided on the shift ring which automatically position each rocker key tooth pitch line at a predetermined angle of engagement with the selected collar or sleeve exterior spline teeth.

BRIEF DESCRIPTION OF THE DRAWINGS

The objects, features and advantages of the present invention are readily apparent from the following detailed description taken in conjunction with the accompanying drawings in which:

FIG. 1 is a fragmentary vertical sectional view of a transfer case showing a clutch rocker range shift mechanism of the present invention;

FIG. 2 is a vertical sectional view taken on the line 2—2 of FIG. 1;

FIG. 2A is an enlarged fragmentary cross sectional vie of the rocker key showing the engagement of its spline tooth with the sleeve external spline teeth;

DETAILED DESCRIPTION OF THE INVENTION

Figure 3:
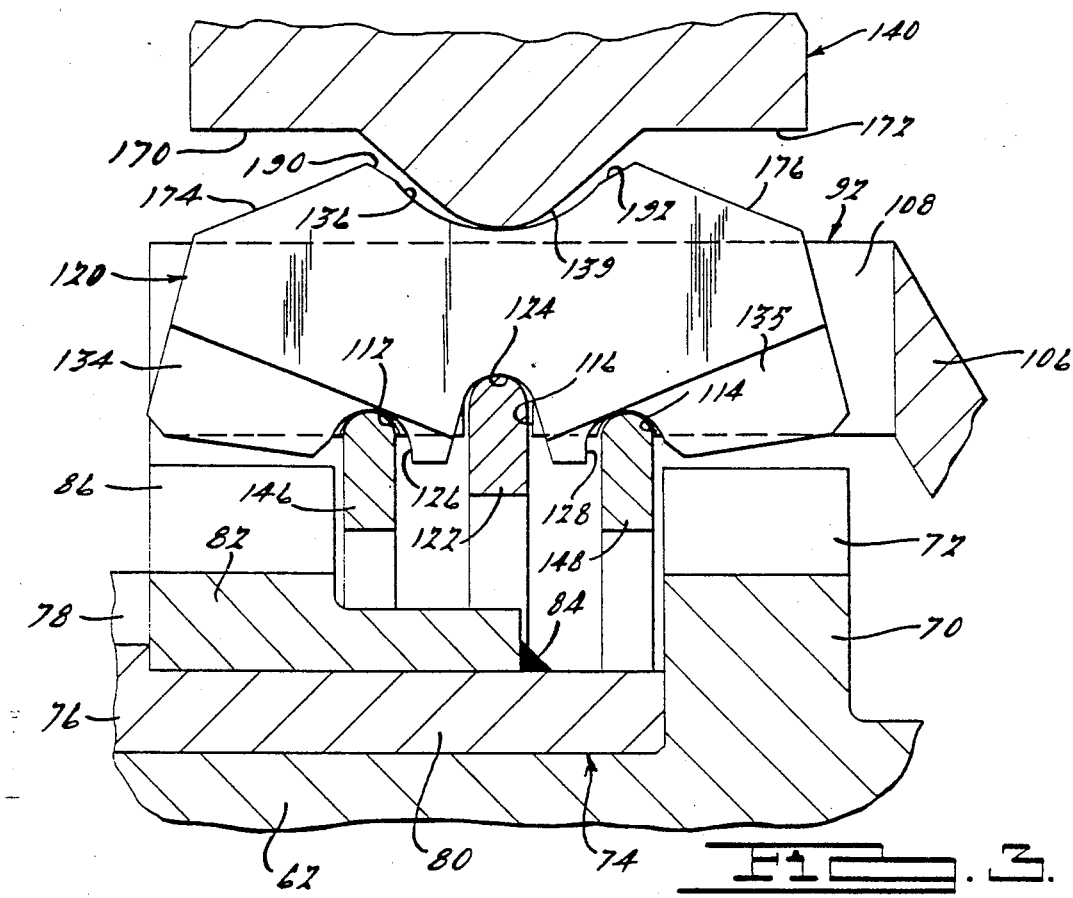
FIG. 3 is an enlarged fragmentary vertical sectional view of the rocker portion of the mechanism.

Referring now to the drawings, and more particularly to FIG. 1, there is shown a portion of a vehicle transfer case 10 for a four-wheel drive vehicle. The transfer case includes a housing, partially indicated at 12, formed by a front half-section 14 and a back half sections (not shown). Reference may be had to U.S. patent application Ser. No. 06/812,661, now U.S. Pat. No. 4,677,873, filed Dec. 23, 1985 and assigned to the same assignee as the present application for a typical transfer case assembly and drive train suitable for use with the present invention.

The transfer case front half-section 14 receives a vehicle transmission output shaft 20 having external splines engaged within the outer end of an internally splined transfer case input stub-shaft 22. The stub shaft 22 is shown rotatably mounted in hub portion 24 of the front half section 14 by ball-bearing assembly 26 and sealingly enclosed by a collar member (not shown).

The input shaft 22 has an input sun gear 32, of a helical planetary gear set reduction assembly generally indicated at 34, formed integral with the stub shaft inner end. The helical sun gear 32 is meshed with a plurality of helical planet gears one of which is shown at 36. Each planet gear is rotatably journalled on a pin 38 supported on a planetary carrier. The planetary carrier includes fore and aft carrier rings 40 and 42, respectively, suitably secured as by machine bolts (not shown). It will be noted that the aft carrier ring 42 is formed with internal splines 44 concentrically arranged about a longitudinal axis common with the principal axis of the input shaft 22. The helical planet gears 36 mesh with a helical annulus ring gear 46 suitably mounted in a press-fit manner, for example, to an inner annular surface 48 formed in the housing front half section 14. The annulus gear 46 is retained against rearward axial movement by a snap ring 50 received in an internal annular notch 52.

An output shaft 54, aligned on the longitudinal axis of the input shaft 22, has a pilot end portion 56 journalled in the input stub shaft axial counter bore 58 by roller bearings 60. The output shaft 54 is surrounded by a concentric intermediate clutch sleeve 62 journally supported at 63 on the output shaft 54 for relative rotation therewith. The sleeve 62 has a left hand end portion 64 fixed thereto as by welds or splines. The portion 64 is formed with external splines 66 in constant engagement with internal splines 68 formed on the sun gear portion 32 of the input shaft 22. The sleeve 62 has a right hand end integral radial portion 70 shown in FIG. 1 formed with external aft clutch teeth 72. As best seen in FIG. 2A the clutch teeth 72 are formed as involute external gear teeth 72 having a pitch diameter indicated by the dotted arcuate construction line, 73. The gear teeth have a pressure angle of about 25° at the pitch diameter.

An outer rocker clutch collar generally indicated at 74, is journally supported on the intermediate sleeve 62 for relative rotation therewith. The collar 74 has a forward portion 76 formed with external splines 78 in constant engagement with aft carrier ring internal splines 44. The collar 74 has an aft portion 80 including an outer concentric gear 82 secured thereto as by weld 84. The gear 82 is formed with external, forward involute gear teeth 86 having a predetermined circular path.

A driving clutch hub assembly, generally indicated at 88, includes a hub portion 90 supporting an annular driving shell portion 92. The shell portion 92 extends in coaxial relation with the shaft 54 and in radially spaced concentric relation surrounding the clutch teeth 72 and 86. The hub portion 90 is secured to the output shaft 54 by means of internal splines 94 in constant engagement with external splines 96 formed on the output shaft 54 and axially retained by snap ring 97. The shaft 54 carries an output ratio gear and drive sprocket 98 thereon which is journally supported by needle bearing 99 so as to rotate relative to the shaft 54. Drive sprocket portion 100 engages an inverted tooth silent chain partially shown in phantom lines at 102, which, in turn, drives a front drive shaft (not shown). Reference may be had to U.S. Pat. No. 4,373,604 issued Feb. 15, 1983 to Lunn et al, for details of a typical transfer case suitable for use with the present invention. The disclosure of the Lunn et al. patent is incorporated by reference herein.

Figure 4:
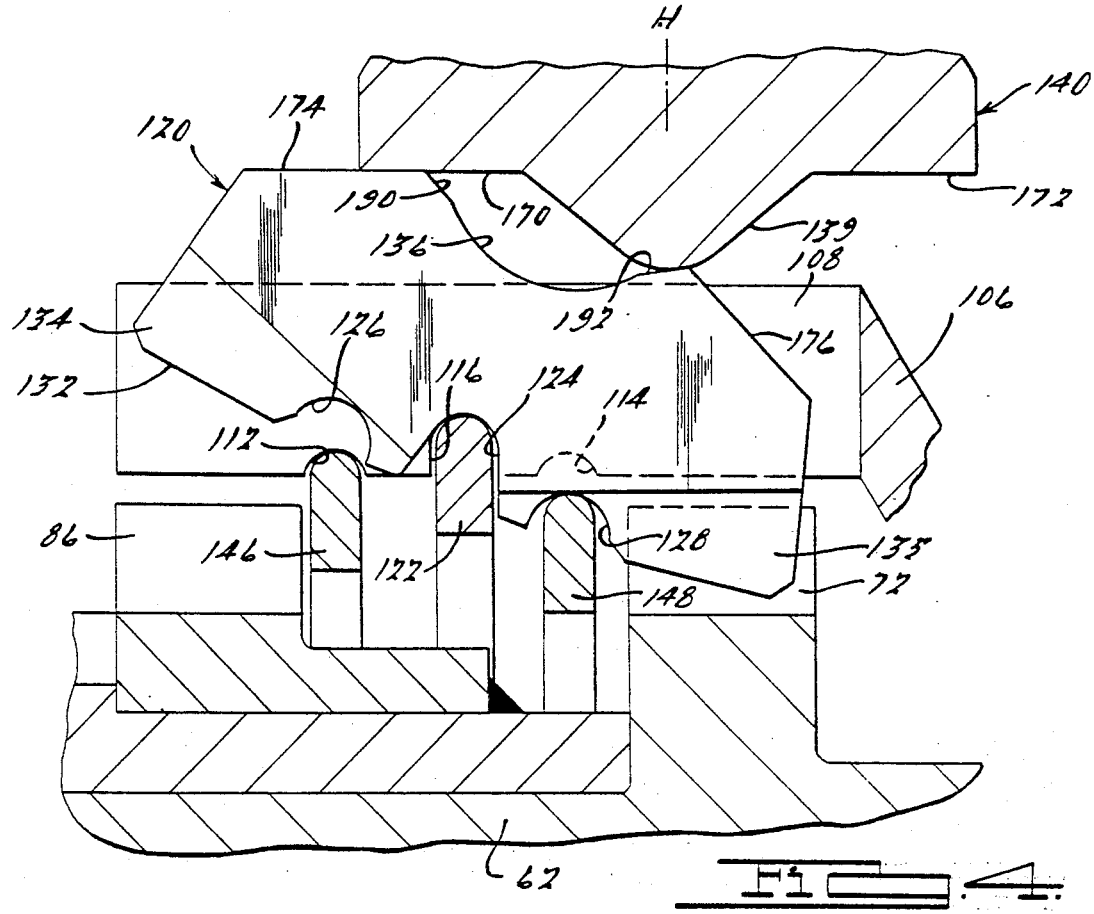
FIG. 4 is a view similar to FIG. 3 showing a rocking key moved to its low range position.
Figure 5:
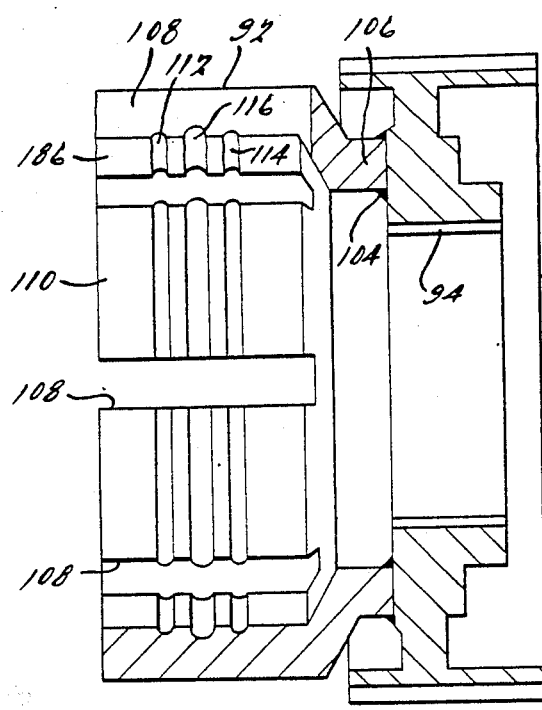
FIG. 5 is an enlarged detail cross-sectional view of the driving hub assembly.

As best seen in FIGS. 1 and 5, the clutch hub assembly 88 has its shell portion 92 welded at 104 to the hub portion 90 by means of its reduced diameter annular neck portion 106. The shell portion 92 is formed with a plurality of uniformly spaced axially directed radial slots 108. In the preferred form shown eight slots are provided uniformly spaced at 45 degree circular intervals as seen in FIG. 2. It will be noted in FIG. 5 that the collar portion 92 has its inner cylindrical surface 110 formed with three interrupted internal annular retaining grooves located in parallel transverse planes. The annular grooves include, namely a pair of identical side grooves 112 and 114 equally spaced from an intermediate or medial groove 116. With reference to FIGS. 3 and 4, it will be seen that the medial groove 116 has a predetermined radial depth greater than the depth of the outer grooves 112 and 114. It will be noted that three retaining grooves 112, 114 and 116 are discontinuous in that they are interrupted by the eight slots 108 extending radially through the shell portion 92.

Figure 6:
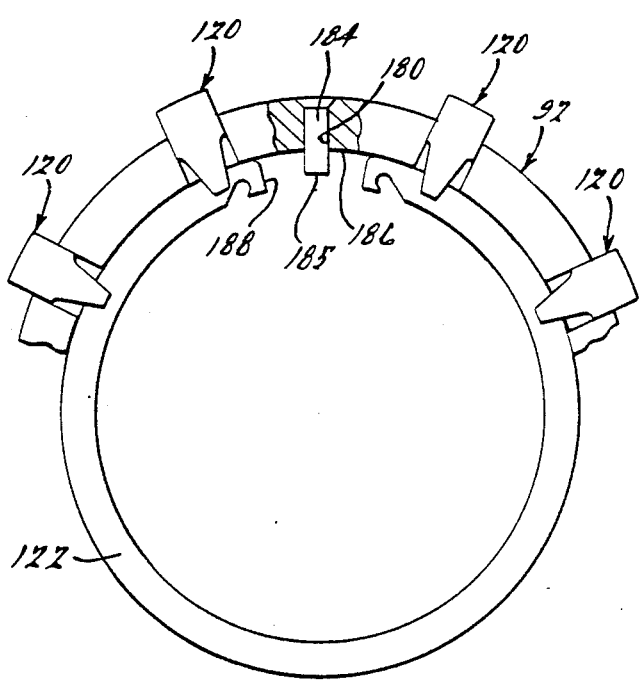
FIG. 6 is an enlarged side elevational detail view of the center snap ring and a fragmentary portion of the driving collar.
Figure 7:
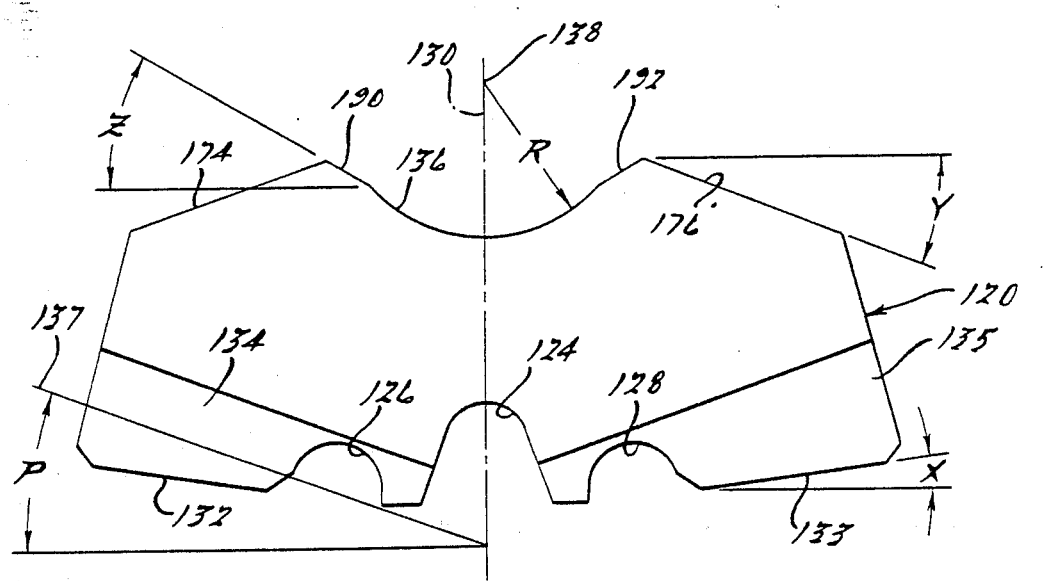
FIG. 7 is an enlarged side elevational detail view of a rocker key.

Located in each of the slots 108 is one of a set of eight rocker keys generally indicated at 120 in FIGS. 1-4. Each rocker key 120 is arranged to radially rock on a center annular spring member in the form of an expanding snap ring 122, shown best in FIG. 6, which is received within the collar portion central retaining groove 116. As seen in FIG. 7, a center internal fulcrum notch 124 is formed in each rocker key intermediate a pair of outer side notches 126 and 128. Each key 120 is symmetrical about its transverse medial plane which includes center line 130. The key 120 has its internal edge formed with internal beveled edges 132 and 133 defined by a fore and an aft inwardly tapered spline tooth 134 and 135, respectively. The teeth inner edges 132 and 133 are sloped upwardly from their associated notches 126 and 128, respectively, at an angle "X". In the disclosed embodiment the angle "X" is of the order of 8 degrees. The teeth 134 and 135 are formed with a pitch angle "P" defined by construction line 137. In the disclosed embodiment the pitch angle "P" is of the order of 20° from the horizontal. This design allows rocking action of each key 120 in a radial plane about its center fulcrum notch 124 by virtue of the notch 124 being captured on the center snap ring 122 outer periphery, as indicated in FIG. 4.

FIGS. 1 and 7 show a typical rocker key 120 having its radially outer surface formed with an arcuate shaped concave depression 136 having a predetermined radius "R" and center of curvature 138. The circumferentially aligned depressions 136 are adapted to capture therein a convex shaped (in longitudinal section) internal annular cam surface 139 formed on shift ring 140. The shift ring 140 has an annular continuous external groove 142 formed around its outer periphery receiving the prongs of a first shift fork 144 therein. The first shift fork 144 is carried by a first fork rail (not shown) which rail is axially movably mounted on the transfer case housing. FIGS. 1 and 3 show the shift ring 140 in its centered or neutral spring biased position indicated by construction line "N" in FIG. 1.

A pair of outer fore and aft annular resilient spring members in the form of expanding snap rings 146 and 148, respectively are provided for retention in their associated collar portion fore and aft internal annular grooves 112 and 114. It will be noted that the fore 146 and aft 148 annular snap rings are also received in each of their associated rocker keys fore and aft shallow notches 126 and 128, respectively, with the key aligned in their central or neutral positions shown in FIG. 3. The three snap rings 122, 146 and 148 are each in the form of C-shaped steel rings having a constant radial thickness around their periphery as seen in FIGS. 3 and 6.

It is necessary to synchronize the transfer case mode shift, i.e., two wheel drive to four wheel drive, to obtain on the go shifting when used with automatic locking-unlocking hubs or front wheel axle disconnects. Thus, a mode clutch mechanism, such as a conventional transmission type strut synchronizer, is provided as part of the driving clutch hub assembly 88 to bring the shifting components to the same speed.

Referring to FIG. 1 a clutch hub synchronizer sleeve 150 is slidably engaged through a spline 152 with outer peripheral spline 154 of the clutch hub 90. There is provided, as is well known in the art, a shifting key (not shown) between the clutch hub 90 and the hub sleeve 150. The shifting key is urged by annular springs (not shown) against the hub sleeve 150. A synchronizing cone portion 156 of the drive sprocket 98 includes a frusto-conical surface 158. A synchronizer blocker ring 160 is mounted on the frustoconical surface 158, being arranged oppositely to the hub sleeve 150. The shifting key is inserted into a key way (not shown) of the synchronizer blocker ring 160 and brings a spline 152 of the hub sleeve 150 into opposed relation with teeth 161 of the synchronizer blocker ring 160, which opposed condition is referred to as "index". The blocker ring 160 is engaged with the shifting key and is rotated together with the hub sleeve 150. When the hub sleeve 150 moves toward the drive sprocket gear teeth 162, the blocker ring 160 is pressed against the synchronizing cone 158 through the shifting key. Prongs 164 of a second shift fork are engaged with an annular continuous groove 165 in the hub sleeve 150 in such a way as to allow rotation of the hub sleeve 150 as well as axial movement thereof. The second shift prongs 164 is carried by a second fork shaft (not shown) which is axially movably mounted on the transfer case housing.

The second shift prongs 164 are shown in FIG. 1 in its two-wheel drive mode indicated by the construction line denoted "2WD". The second shift fork is moved to the right as viewed in FIG. 1 from a two-wheel drive mode to its fourwheel drive mode indicated by the construction line denoted "4WD". After achieving equal rotary speed, the sliding clutch sleeve completes the shift by having its spline 152 engaging the clutching gear teeth 162 on the drive sprocket 98. As a result the drive sprocket gear portion 100 moves the chain 102 driving the vehicle front wheels by means of a front drive shaft (not shown).

In operation, with the first shift fork 144 being moved axially to the right the shift ring 140 is placed in its FIG. 4 high range or "H" position. This results in the cam surface 139 simultaneously pivoting all eight of the rocker keys 120 about their fulcrum center grooves 124 on center snap 122. The radial outward force of the aft snap ring 148 is overcome and the keys 120 are rocked to the position shown in FIG. 4 wherein their aft teeth 135 engage intermediate sleeve external teeth 72. In high range "H" the engine torque is thus transferred directly from the input stub shaft 22 through the engaged splines 66 and 68 and sleeve 62 to the rocker keys 120. The keys 120, in turn, transfer torque to the drive collar portion 92, via its notches 108, and thence to hub portion 90 and output shaft 54 through the engaged splines 94 and 96. It will be noted that upon the keys 120 being rocked to the FIG. 4 position the aft snap ring 148, captured in aft grooves 128, is compressed radially inwardly.

Upon the shift ring 140 being initially moved toward the left in FIG. 1 the compressive force on aft snap ring 148 is released. This causes the compressed snap ring 148 to exert a radially outward or expanding bias force on the rocker keys 120 until ring 148 is contained in groove 114 thereby positively returning the keys to their neutral position as shown in FIG. 3.

When the shift fork 144 is moved axially to the left the shift ring 140 is placed in its low range or "L" position (not shown). As a result the keys 120 are rocked in the opposite direction causing their teeth 134 to drivingly engage external rocker clutch collar teeth 86. In its low range or "L" position torque is transferred from the input stub shaft 22 through the planetary sun gear 32 and planet gears 36 to the carrier ring 42. From the carrier ring the torque flow path is through the engaged splines 44 and 78 and rocker keys 120 to the drive collar portion 92 and thence to the clutch hub 90 and output shaft 54 via engaged splines 94 and 96. To return to the range neutral "N" position the shift ring 140 is initially moved toward the right whereby compression force is released from the forward snap ring 146. This causes the forward snap ring 146 to exert a radially outward biasing force on the keys 120 until ring 146 is contained in groove 112 positively returning the keys to their neutral FIG. 3 position. Thus, applicant's arrangement controls the outward biasing force of the snap ring 146 on the keys 120 within a predetermined spring range to assure instant return of the keys to their neutral or centered mode.

It will be appreciated that the snap rings are designed such that the radial outward spring biasing force exerted by the fore and aft snap rings 146 and 148 is a predetermined amount less than the radial outward spring locking force exerted by the center snap ring 122.

As best seen in FIG. 3, the shift ring 140 is provided with annular rim-like axially extending fore and aft stop surfaces 170 and 172 symmetrically formed in its fore and aft faces, respectively. Each key 120 has a pair of sloped upper chamfered edge surfaces 174 and 176. The chamfered edge surfaces are sloped downwardly at predetermined equal acute angles from the horizontal as indicated by angle "Y" in FIG. 7. In the disclosed form the acute angle "Y" is of the order of 20 degrees, i. e. equal to the pitch angle "P" of key teeth 134 and 135. It will be noted in FIG. 4 that the key 120 is rocked through a predetermined arc substantially equal to the pitch angle "P" wherein the forward chamfered surface 174 engages the shift ring forward stop rim 170. This insures a controlled uniform pitch diameter engagement between the clutch teeth 72 and the key teeth 135. The aft chamfered surface 176 engages the shift ring aft stop rim 172 in a like manner when the shift ring 140 is moved to its low range position "L".

It will be noted in FIGS. 2 and 6 that radial bores 180 and 182 are provided in the collar portion 92. FIG. 6 shows a countersunk headed fastener 184 in bore 180 such that its shank portion 185 extends radially inwardly a predetermined distance beyond the inner surface 186 of the collar portion. The bore 180 principal axis is aligned on the transverse plane of the snap-ring 122. In this way upon insertion of the fastener 184 its shank portion 185 is positioned to provide a stop to extended rotational movement of the snap-ring 122 relative to the collar portion 92. Thus, the end surface 188 of the snap-ring 122 will contact the shank 185 to prevent displacement of the keys 120 by means of the gap in the snap-ring 122. In a like manner countersunk headed fasteners (not shown) are inserted in the pair of radial bores 182 to retain the outer snap rings 146 and 148 against excessive rotational movement.

The unique arrangement of applicant's rocker key assembly provides a mechanism that easily shifts under load. This is achieved by virtue of each key member 120 having planar sloped contact surfaces 190 and 192 each being formed at a predetermined acute slop angle "Z" from the horizontal. In the preferred form the slope angle "Z" is about 28 degrees or about 8 degrees greater than the pitch angle "P" of the splines 134 and 135. As seen in FIG. 4 the shift ring cam surface 139, upon being shifted to the right to its high range "H" position, frictionally engages the key member sloped contact surface 192. Because of the slope angle "Z" a predetermined frictional retention of the shift ring 140 is developed sufficient to positively retain the spline teeth 135 fully engaged with the external gear teeth 72 in opposition to the drive torque on sleeve 62. Because of the pitch angle "A" of key member splines 72 the drive torque on sleeve 64 provides an outward radial tangential torque from teeth 72 tending to force the key members 120 to their neutral centered position of FIG. 3. The resultant force balance is such that a minimal axial shifting force on shift ring 140 will easily release the frictional engagement of slope surface 192 on cam surface 139.

Although only one embodiment of the invention has been disclosed and described, it is apparent that other embodiments and modifications of the invention are possible.

What is claimed is:

1. In a coupling device for a motor vehicle gearbox of the kind including first and second shafts aligned on a common axis, at least one relatively rotatable coupling member coaxial with said shafts being provided with a set of axially spaced external spline teeth of predetermined pitch and diameter, means for engaging said coupling member with said first shaft, a cylindrical drive shell having inner and outer annular surfaces surrounding said coupling member set of external spline teeth in a concentric manner, means for engaging said drive shell with said second shaft, said drive shell formed with a plurality of axially directed equally circumferentially spaced radially extending slots, said drive shell inner surface formed with an annular medial groove arranged symmetrical with respect to a transverse medial plane, a pair of annular side grooves arranged symmetrical with respect to and axially spaced from said medial groove transverse medial plane, said medial groove and each said side groove being discontinuous in that they are interrupted by said axially directed drive shell slots, a rocker key located in each said slot defining inner and outer radially directed faces each protruding beyond said shell inner and outer surfaces, respectively; each said rocker key inner face formed with a spline tooth on each end thereof, each said rocker key inner face formed with a center notch and a pair of side notches, an annular center spring and a pair of annular side springs captured in said shell medial groove and said shell side grooves, respectively; such that said center spring is received in each rocker key center notch and each said side spring is received in its associated rocker key side notch, each said rocker key normally aligned in its neutral centered position symmetrically disposed with respect to said medial plane, each said rocker key outer surface formed with a central depression, an annular shift ring surrounding said drive shell in a coaxial manner with said common axis, means supporting said shift ring for axial reciprocal movement from a neutral position aligned in said medial transverse plane, said shift ring having a cam surface in engagement with each said rocker key central depression, whereby said shift ring being operatively effective when moved axially in one direction a predetermined distance from its neutral centered position to an engaged position such that said shift ring cam surface pivots each said rocker key about said center spring from its neutral position causing one of said pair of side springs to be compressed by each said rocker key one side notch, and resulting in each said rocker key one end tooth drivingly engaging its associated external spline teeth such that drive torque is adapted to be transmitted between said first and second shafts, and whereby upon said shift ring being returned to its neutral centered position said one annular side spring being operative to resiliently bias each said rocker key to its neutral centered position disconnecting said first and second shafts wherein said one side spring is again captured in its associated shell side groove and each said rocker key other side notch again contacts said other side spring.

2. The clutch rocker coupling device as set forth in claim 1, wherein each said rocker key upper surface has a chamfered surface formed at a predetermined acute angle from the horizontal with each said rocker key disposed in its neutral centered position, wherein each said chamfered surface adapted to contact an associated concentrically disposed stop rim on said shift ring upon said shift ring being moved axially from its neutral centered position to one of its respective engaged positions.

3. The clutch rocker coupling device as set forth in claim 2, wherein each said predetermined chamfered surface acute angle is of the order of 20 degrees whereby upon each said rocker key being pivoted from its neutral position to an engaged position each said rocker key one end tooth contacting its coupling member external spline teeth in a controlled engagement manner.

4. The coupling device as set forth in claim 1, wherein each said center and side annular spring is in the form of an expanding snap ring of "C" configuration.

* * * * *